US010104285B2

(12) United States Patent
Wang et al.

(10) Patent No.: US 10,104,285 B2
(45) Date of Patent: Oct. 16, 2018

(54) METHOD AND APPARATUS FOR HIGH RESOLUTION DIGITAL PHOTOGRAPHY FROM MULTIPLE IMAGE SENSOR FRAMES

(71) Applicant: OmniVision Technologies, Inc., Santa Clara, CA (US)

(72) Inventors: Qin Wang, San Jose, CA (US); Gang Chen, San Jose, CA (US); Dajiang Yang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 46 days.

(21) Appl. No.: 15/249,787

(22) Filed: Aug. 29, 2016

(65) Prior Publication Data

US 2018/0063424 A1   Mar. 1, 2018

(51) Int. Cl.
H04N 5/232 (2006.01)
H04N 5/225 (2006.01)
H04N 5/374 (2011.01)
H04N 9/04 (2006.01)

(52) U.S. Cl.
CPC ....... *H04N 5/23232* (2013.01); *H04N 5/2254* (2013.01); *H04N 5/374* (2013.01); *H04N 9/045* (2013.01)

(58) Field of Classification Search
CPC .. H04N 5/23232; H04N 9/045; H04N 5/2254; H04N 5/374
See application file for complete search history.

(56) References Cited

U.S. PATENT DOCUMENTS

| 9,057,896 B1 * | 6/2015 | Baldwin | H04N 5/2254 |
| 2009/0213321 A1 * | 8/2009 | Galstian | G02B 3/14 349/200 |
| 2010/0128164 A1 * | 5/2010 | Petljanski | H04N 5/2254 348/360 |
| 2014/0125825 A1 | 5/2014 | Baer et al. | |
| 2015/0160426 A1 | 6/2015 | Chao et al. | |

FOREIGN PATENT DOCUMENTS

EP        0769879 A1 *   4/1997   ............. G02B 27/46

OTHER PUBLICATIONS

Lan, H-C, et al; "Non-mechanical sub-pixel image shifter for acquiring super-resolution digital images" Dec. 7, 2009 / vol. 17, No. 25 / Optics Express pp. 22992-23002; Received Aug. 25, 2009; revised Oct. 15, 2009; accepted Oct. 15, 2009; published Dec. 1, 2009.

* cited by examiner

*Primary Examiner* — Abdelaaziz Tissire
(74) *Attorney, Agent, or Firm* — Lathrop Gage LLP

(57) ABSTRACT

A camera system has a lens focusing incoming light through a deflector system having at least one deflector plate onto a photosensor array. An image processor captures at least a first image with the deflector system in a first position and a second image with the deflector system in a second position to provide a focal point offset in a first axis on the photosensor array, and the firmware is configured to prepare an enhanced image from at least the first and second images. A method of imaging includes focusing incoming light through a deflector system having at least one deflector plate onto a photosensor array; receiving at least a first image with the deflector system in a first position; receiving a second image with the deflector system configured providing a focal point offset on the photosensor array; and preparing an enhanced image from the first and second images.

7 Claims, 3 Drawing Sheets

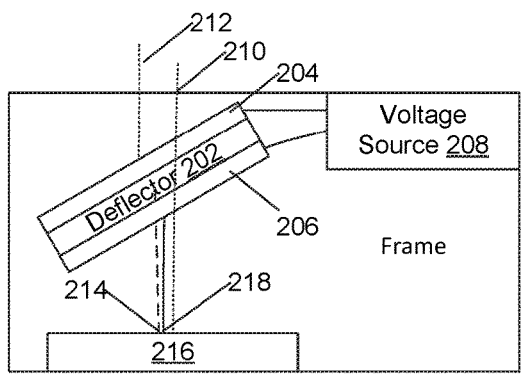
Fig. 3
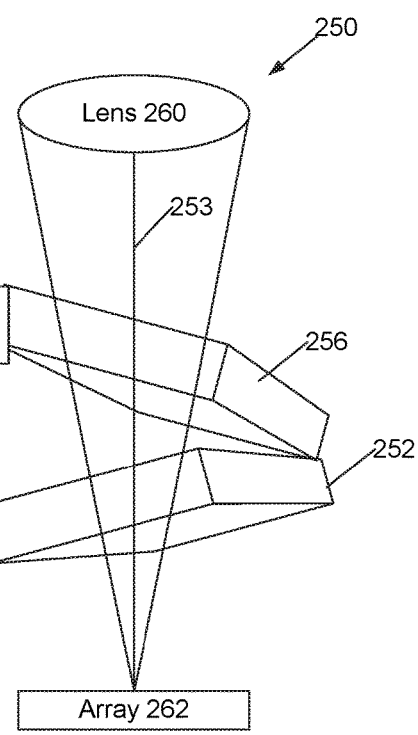
Fig. 4
| R/C | 1 | 2 | 3 | 4 | 5 | 6 |   |
|-----|---|---|---|---|---|---|---|
| 1   | G | R | G | R | G | R |   |
| 2   | B | G | B | G | B | G |   |
| 3   | G | R | G | R | G | R |   |
| 4   | B | G | B | G | B | G |   |
| 5   | G | R | G | R | G | R |   |
| 6   | B | G | B | G | B | G |   |
|     |   |   |   |   |   |   |   |
Fig. 6

METHOD AND APPARATUS FOR HIGH RESOLUTION DIGITAL PHOTOGRAPHY FROM MULTIPLE IMAGE SENSOR FRAMES

BACKGROUND

Photosensor array integrated circuits are organized as an array of photosensor cells, each photosensor cell having a photodiode or phototransistor together with transistors arranged to precharge a capacitance of the photosensor cell prior to an exposure, the capacitance may be a junction capacitance of a photodiode. The photodiode or phototransistor is typically arranged to discharge the capacitance proportionally to light received on the photodiode or phototransistor. The photosensor cell also has transistors arranged to read charge from the capacitance. The array may have one or more defective photosensor cells, or photosensor cells that do not respond to light in quite the same way as most other photosensor cells of the array. During production, photosensor arrays are tested and those arrays having excessive or objectionably defective or nonuniform photosensor cells are discarded, as large arrays are more likely to have defective cells, the larger the array the greater the cost.

Photosensor arrays typically are formed with a "Bayer-pattern" of color filters over the photodiodes or phototransistors of the photosensor array; typically in macrocells of four cells. Each macrocell can only provide one full three-color signal, as such, inherent spatial resolution of color is significantly less than the stated pixel count of the array because color detection requires multiple photodiode or phototransistor cells. In a typical Bayer-pattern macrocell, three cells are each covered by a different color filter, such as a red, a green, and a blue filter, the fourth photosensor of the cell may be uncovered or may be covered with a color filter duplicating one of the other three cells.

At low light levels, such as at night, photosensor arrays with large photodiodes and/or a long integration time are desirable to capture sufficient photons to give adequate intensity resolution; however high spatial resolution images typically require large numbers of photodiodes. Image sensors having large numbers of large photodiodes are much more expensive than sensors with small numbers of large photodiodes, or with large numbers of small photodiodes; they also are more likely to have defects than sensors with smaller surface area.

Typically a portion of each photosensor array's active surface is occupied by the precharge and selection transistors necessary to prepare each photodiode for exposure, and to read exposed photodiodes. Other space is often consumed with interconnect and guardrings intended to reduce crosstalk between adjacent photodiodes. Shapes, even bright lines, well-focused on the image sensor array may not be captured in an image if they land entirely between photodiodes.

There are situations—such as tripod-based landscape and still-life photography—where photographers wish for very high resolution images of scenes that undergo little, if any, movement during an exposure.

SUMMARY

In an embodiment, a camera system has a lens focusing incoming light through a deflector system having at least one deflector plate onto a photosensor array. An image processor is configured to capture at least a first image with the deflector system in a first position and a second image with the deflector system in a second position to provide a focal point offset in a first axis on the photosensor array, and the firmware is configured to prepare an enhanced image from at least the first and second images.

In another embodiment, a method of imaging includes focusing incoming light through a deflector system having at least one deflector plate onto a photosensor array; receiving at least a first image with the deflector system in a first position; receiving a second image with the deflector system configured in a second position to provide a focal point offset on the photosensor array; and preparing an enhanced image from at least the first and second images.

BRIEF DESCRIPTION OF THE FIGURES

FIG. 3 is a schematic diagram illustrating an electrooptical image deflection device adapted for use in an alternative embodiment.

FIG. 4 is a schematic diagram illustrating two image deflection devices of the types illustrated in FIGS. 2 and 3, positioned in series in the optical path of the camera to provide deflection in two axes of the photosensor array.

FIG. 6 is an illustration of a Bayer-pattern photosensor, with R indicating Red filters, B indicating Blue filters, and G indicating Green filters on phototransistors or photodiodes of the array.

DETAILED DESCRIPTION OF THE EMBODIMENTS

Figure 1:
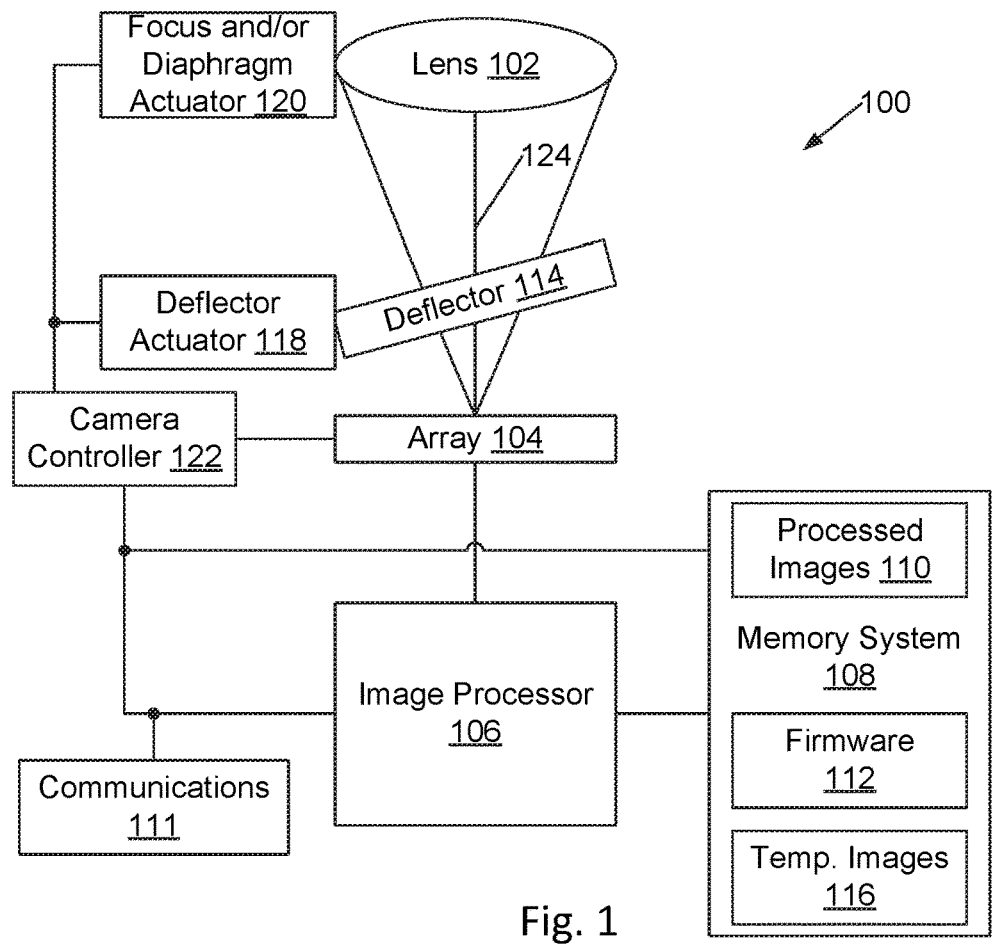
FIG. 1 is a block diagram of a camera system in an embodiment.

We propose a camera system that produces images of stationary objects having a spatial resolution greater than that offered directly by the photosensor array of the camera.

The camera system 100 has a lens 102 that focuses incoming light onto a photosensor array 104; the photosensor array is a CMOS integrated circuit having an array of cells each having a photodiode or phototransistor with associated precharge and sensing transistors, such as is known in the art of digital photography. A digital image processor 106 is coupled to read photosensor array 104, image processor 106 has a memory system 108 and is adapted to read images from photosensor array 104, to process these images under control of machine readable instructions in firmware 112 stored in memory 108, and store processed images 110 in memory 108. In an embodiment, memory 108 is a hierarchical, heterogeneous, memory system having a cache memory, a read-only memory containing firmware 112, RAM adapted for use in intermediate processing and storage of temporary images 116, and a removable "flash" memory card, such as an "SD" card, adapted for storing processed images 110. In an alternative embodiment, memory 108 has a nonremovable "flash" memory adapted for storing processed images 110, and the camera has a communications circuit 111 for transmitting images to a computer or other electronic device such as a cell phone or tablet computer. In another alternative embodiment, the camera system is built into another electronic device, such as a cell phone, tablet, or notebook computer, and the portion of memory 108 adapted for storing processed images is a memory of the cell phone, tablet, or notebook computer; in this alternative embodiment one or more other portions of the camera system, such as image processor 106, may also serve double-duty as components of the cell phone, tablet, or notebook computer.

The camera system has an image deflector 114 that operates in conjunction with at least one deflector actuator 118, the deflector being adapted to shift an image on photosensor array 104 by a determined distance in at least one axis. Deflector actuator 118 operates under control of a camera controller 122 that is also adapted to control operation of the image processor 106, the photosensor array 104, and optional focus and/or diaphragm actuator 120. The camera system may have one or more additional components such as batteries, battery charge sensors, control buttons including a "shutter" trigger button, a flash lighting system, microphone and audio processing circuitry, a communication system such as may be adapted for wireless or USB communications, and other devices.

Figure 2:
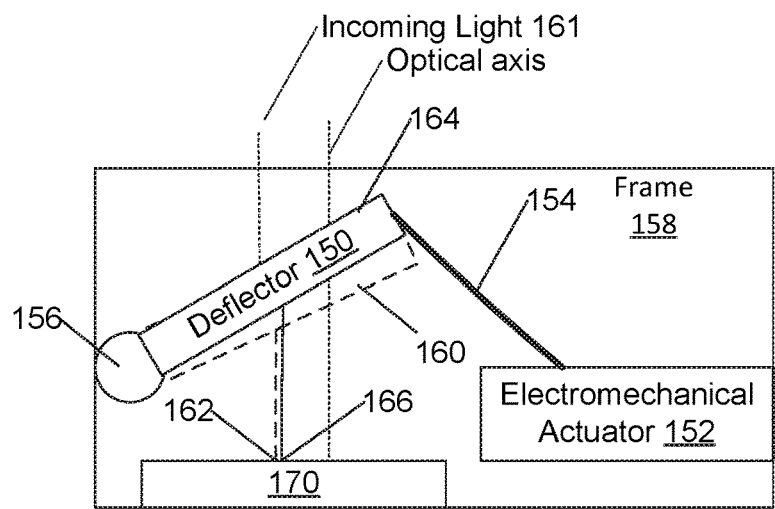
FIG. 2 is schematic diagram of an electromechanical image deflection device adapted for use in an embodiment.

In an embodiment, the image deflector 114 includes at least one transparent plate 150 (FIG. 2) positioned within an optical system defined by lens 102 and photosensor array 104, and oriented at a non-perpendicular angle to axis 124 of the optical system, in this embodiment deflector actuator 118 is an electromechanical actuator 152, which may be an electromagnetic actuator, or in an alternative embodiment a piezoelectric actuator, that is coupled to mechanically shift the deflector between at least a first angular position to a second angular position not equal to the first angular position within the optical system. In a particular embodiment, electromechanical actuator 152 couples to plate 150 either directly or through a pushrod 154. In this embodiment, electromechanical actuator 152 may be coupled to move a first end of deflector plate 150, a second end of deflector plate 150 being anchored through a pivot, hinge, or flexible mounting 156 to a mounting frame 158 to which electromechanical actuator 152 is attached. The deflector plate has an index of refraction greater than that of air. When deflector 150 is at a first angle 160, incoming light 161 from a particular point of an object as focused by the lens is focused onto a first point 162 on the photosensor array 170. When deflector 150 is driven by the actuator to a second angle 164, all else being equal, the incoming 161 light from the particular point of the object is differently refracted through the plate because of the difference between the first and second angle of the plate, such that the same light is focused onto a second point 166 on the photosensor array 170, thereby displacing the image of the object on photosensor array 170 in an axis of the array. Calibration of this displacement requires adjustment of plate angle and mechanical actuator displacement.

Note that the angles shown for the deflector 114, 150, 202 in all figures is intended to illustrate that the deflector lies at an angle; the angle illustrated is far in excess of actual angles, and in embodiments pushrod 154 may be nearly vertical.

In an alternative embodiment illustrated in FIG. 3, the image deflector is a transparent plate 202 fabricated from an electro-optic modulating (EOM) material such as lithium niobate, lead-lanthanum-zirconate-titanate (PLZT), lithium tantalate, or certain polymers. The transparent EOM-material plate 202 is coated on a first and second opposed side with separate electrodes comprising transparent electrical conductor layers, serving as a first 204 and second 206 plate of a capacitor, with the EOM material serving as dielectric of the capacitor. In a particular embodiment, the transparent capacitor plates 204, 206 are formed of indium-tin-oxide (ITO) or tin oxide (TO). In this embodiment, deflector actuator 118 is a controllable voltage source 208 coupled to apply a first or a second voltage between the first and second plate of the capacitor; the first and second voltage being different. In a particular embodiment, the first voltage is zero volts. The deflector is set at a particular predetermined, non-perpendicular, angle to the axis 210 of the optical system between lens 102 and photosensor array 104. EOM materials change effective refractive index with applied high voltages relative to their refractive index with applied low voltages. Therefore, when voltage source 208 provides the first voltage between the first 204 and second plate 206 of the capacitor, incoming light 212 from a particular point of an object is focused on a first point 214 on image sensor array 216. When the voltage source provides the second voltage between the first 204 and second 206 plate of the capacitor, the refractive index of the plate changes and incoming light 212 from the particular point of the object is focused on a second point 218 of the image sensor array 216, thereby displacing the image of the object on photosensor array 216 in an axis of the array 216. Calibration for a particular displacement is achieved by adjusting the first and second voltages.

Embodiments having a single deflector plate may achieve X and Y displacement by rotating a single deflector plate in two orthogonal axes. An alternative embodiment 250 (FIG. 4) achieves X and Y displacement by using two deflector plates 252, 256 respectively tilted on orthogonal axes and located in series along the optical axis 253 of the optical system between lens 260 and photosensor array 262. Embodiments according to FIG. 4 may have either independent mechanical X and Y actuators or, if fabricated from electrooptical materials, independent electronic voltage-source X and Y actuators 254, 258 for each deflector plate 252, 256 respectively.

Figure 5:
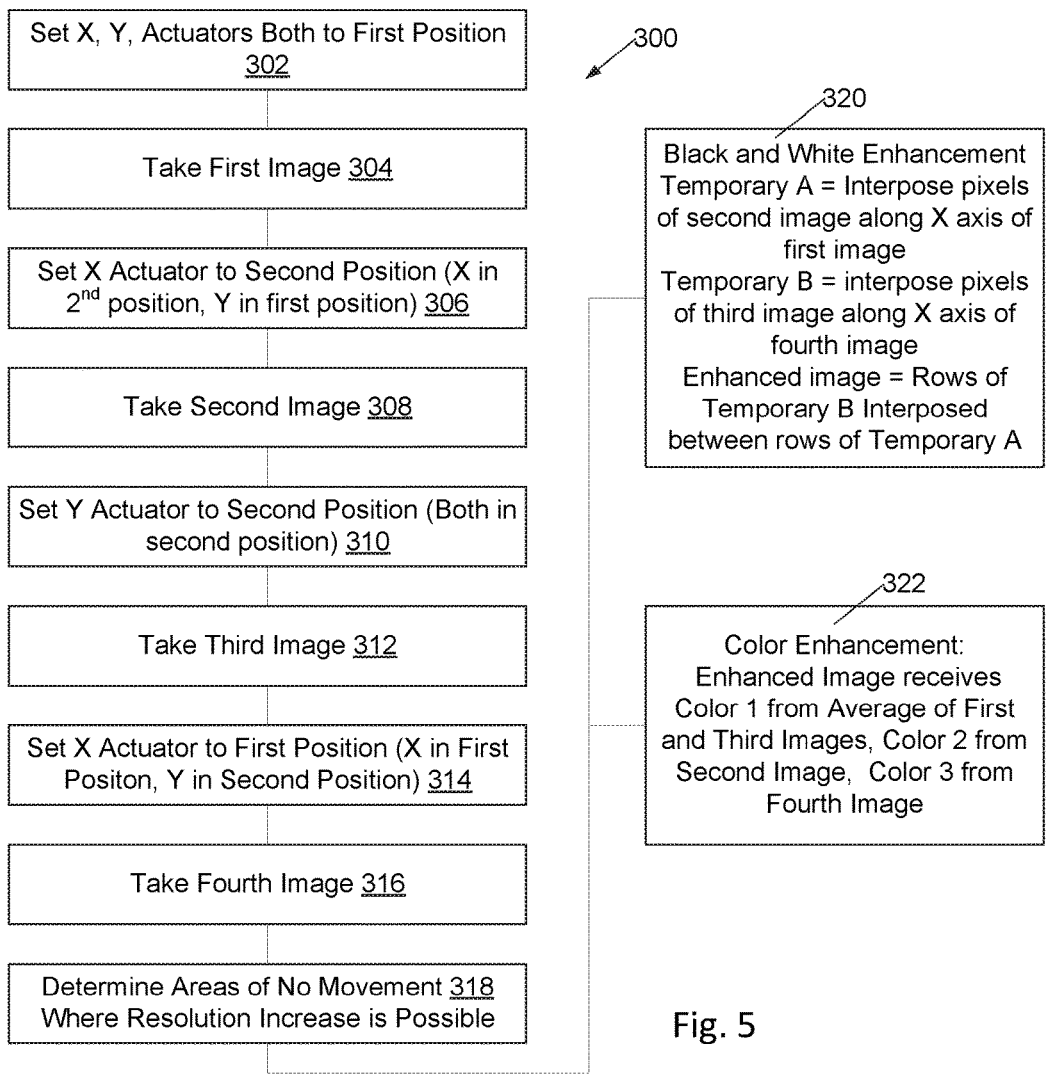
FIG. 5 is a flowchart illustrating operation of the camera system of FIG. 1.

After any autofocusing, image acquisition 300 (FIG. 5) with a two-axis (X and Y) embodiment of the system of FIG. 1 using the optical path of FIG. 4 begins with firmware 112 executing in the camera controller 122 to set 302 both X and Y axis deflectors to a first position. The photosensor array 104 is then precharged and read to take 304 a first image and storing it in temporary images 116 portion of memory 108 by firmware 112 from memory system 108 executing in image processor 106. A deflector is then switched to a second position; in an exemplary embodiment the X actuator is set 306 to the second position. A second image is taken 308 and stored in temporary images 116. Another deflector is then switched to the second position, in the exemplary embodiment the Y actuator is set 310 to the second position so both X and Y are in the second position. A third image is then taken 312 and stored in temporary images 116. An actuator is then reset 314 to the first position, in the exemplary embodiment the X actuator is returned to the first position, so that only the Y actuator is in the second position. A fourth image is then taken 316 and stored in temporary images 116. The four captured images are then processed by image processor 106 to create an enhanced image that is compressed and stored in processed images 110 region of memory system 108. In some embodiments, capture and saving of the third image is omitted.

In black-and-white enhancement 320 embodiments, the deflector plates are configured and calibrated to offset focused images on the photosensor array by a distance of (an integer N plus one-half) times a photosensor center to photosensor center distance on the array. N may in some embodiments be zero. If N is nonzero, before interposing pixels, an alignment shifting of pixel data in the second, third, and fourth images is performed. These embodiments permit a doubling of effective X and Y resolution in processed images from the raw captured images by interposing pixels of the second image between pixels of each row of the first image to create a temporary image A, and interposing pixels of the third image between pixels of the fourth image to create a temporary image B. Rows of temporary image B are then interposed between rows of temporary image A to create an enhanced resolution image that may be compressed and stored as processed image 110.

A color enhancement 322 embodiment uses a filter having a Bayer-type pattern of cells having at least three primary color filters in each cell. The deflector plates are configured and calibrated to offset focused images on the photosensor array by a distance of an integer (N) times a photosensor center to photosensor center distance on the array. N may in some embodiments be one or more, if N is greater than one a preliminary alignment-shifting of the images is performed. Assuming the fourth filter in each Bayer-pattern cell 350, as seen on FIG. 6, is a duplicate of the first filter, and located on a diagonal from the first filter, the enhanced image is derived by taking the average of intensities of the first and third captured images giving the first color value at a particular pixel, with the second image giving the second color value, and the fourth image as the third color value. If the first color is green, the second red, and the third blue, this will give a traditional red-green-blue (RGB) three-color-plane color pixel that can be compressed and stored as part of processed image 110. An adjacent pixel in X of the enhanced image, however, receives its first color value from averaging the second and fourth captured image, its second color value from the first captured image, its third color value from the third captured image. An adjacent pixel in Y of the enhanced image receives its first color value from averaging the second and fourth captured image, its third color value from the first captured image, and its second color value from the third captured image. Alternative operations for determining the three color planes of each pixel may be devised for use with patterns of color filters differing from that illustrated in FIG. 6.

Many photographs are taken of moving objects; the imaging technique above described relies on little movement taking place between capture 304 of the first image and capture 316 of the fourth image. In order to avoid motion-blur, in an embodiment, prior to generating processed images, edge detection is performed on the images. Detected locations of edges in these images are compared to determine areas of rapid movement and areas of no movement during the time elapsed between capture of the first and fourth images are captured. In this embodiment, the above-described black-and-white or color image enhancement is suppressed in areas of rapid movement, being performed only in areas of no movement.

We note that capture of the first, second, third, and fourth images, storing these images in temporary images 116, edge detection, interposing pixels of images, and image compression are all performed by image processor 106 executing firmware 112 stored in memory 108, and these functions are performed at photograph-taking times indicated by camera controller 122 or, in embodiments embedded in a cell phone, tablet, or laptop computer, at times indicated by a processor of the cell phone, tablet, or laptop computer. Further, image processor 106 may in some embodiments perform additional functions such as Bayer-pattern color resolution determination for areas of rapid movement, and autofocus determination.

Combinations of Features

The features above discussed may be combined in multiple ways in embodiments. For example, the electromechanical and electrooptic deflectors herein described may both be used with either the color-resolution enhancement method described herein, or with the monochrome pixel-interleaving resolution enhancement method described herein. Among specific embodiments anticipated by the inventors are:

A camera system designated A including an optical path with a lens configured to focus incoming light onto a photosensor array, a deflector system comprising at least one deflector plate disposed at a non-perpendicular angle between the lens and the photosensor array; an actuation device coupled to the deflector plate and operable under command; and an image processor coupled to receive images from the photosensor array, to store images in a temporary-storage area of a memory system, to process images from the temporary storage area of the memory system, and to save processed images in a processed-images area of the memory system, all under direction of firmware from the memory system. The camera system is configured to capture at least a first image with the deflector system in a first configuration and a second image with the deflector system in a second configuration to provide a focal point offset in a first offset axis on the photosensor array between the first and second image, and the firmware is configured to prepare an enhanced image from at least the first and second images.

A camera system designated AA including the camera system designated A wherein the deflector system is configurable to provide a focal point offset in a second axis perpendicular to the first offset axis on the photosensor array, wherein the camera system is configured to capture at least a third image with the deflector system configured to provide the focal point offset in the second axis, and wherein the firmware is configured to prepare the enhanced image from at least the first, second, and third images.

A camera system designated AB including the camera system designated A or AA wherein the deflector system is configured such that the second image is offset by an integer number of pixels greater than or equal to one from the first image, and where each pixel of the enhanced image receives as color information intensities from at least two of the first, second, third, and fourth images.

A camera system designated AC including the camera system designated A or AA wherein the deflector system is configured such that the second image is offset by an integer number of pixels plus half a pixel from the first image, and where the firmware is configured to prepare the enhanced image by interposing pixels of at least one of the first, second, third, and fourth images in another image of the first, second, third, and fourth images.

A camera system designated AD including the camera system designated A, AA, AB, or AC wherein the actuation device comprises an electromechanical actuator coupled to move the deflector plate between a first and a second position, the first position corresponding to the first configuration.

A camera system designated AE including the camera system designated A, AA, AB, or AC wherein the actuation device is a voltage source coupled to provide voltages to transparent conductive electrodes on the deflector plate, wherein the deflector plate is formed of an electrooptical material, wherein the actuation device applies a first voltage between the transparent conductive electrodes in the first configuration of the deflector system, and a second voltage between the transparent conductive electrodes in the second configuration of the deflector system.

A method of imaging designated B including focusing incoming light onto a photosensor array; the focused incoming light passing through a deflector system including at least one deflector plate disposed between the lens and the photosensor array and an actuation device coupled to the deflector plate; receiving at least a first image with the deflector system in a first configuration; receiving a second image with the deflector system in a second configuration to provide a focal point offset in a first axis on the photosensor array; and preparing an enhanced image from at least the first and second images.

A method of imaging designated BA including the method designated B wherein the deflector system is configurable to provide a focal point offset in a second axis perpendicular to the first offset axis on the photosensor array, and further comprising capturing a third image with the deflector system configured to provide the focal point offset in the second axis.

A method of imaging designated BB including the method designated B or BA wherein the deflector system is configured such that the second image is offset by an integer number of pixels greater than or equal to one from the first image, and where each pixel of the enhanced image receives as color information intensities from at least two of the first, second, and third images.

A method of imaging designated BC including the method designated B or BA wherein the deflector system is configured such that the second image is offset by an integer number of pixels plus half a pixel from the first image, and where the firmware is configured to prepare the enhanced image by interposing pixels of at least one of the first, second, and third images in another image of the first, second, and third images.

A method of imaging designated BD including the method designated B, BA, BB, or BC wherein the actuation device comprises an electromechanical actuator coupled to move the deflector plate between a first to a second position, the first position corresponding to the first configuration.

A method of imaging designated BE including the method designated B, BA, BB, or BC wherein the actuation device is a voltage source coupled to provide voltages to transparent conductive electrodes on the deflector plate, wherein the deflector plate is formed of an electrooptical material, wherein the actuation device applies a first voltage between the transparent conductive electrodes in the first configuration of the deflector system, and a second voltage between the transparent conductive electrodes in the second configuration of the deflector system.

It should be noted that the matter contained in the above description or shown in the accompanying drawings should be interpreted as illustrative and not in a limiting sense. The following claims are intended to cover generic and specific features described herein, as well as all statements of the scope of the present method and system.

What is claimed is:

1. A camera system comprising
a lens configured to focus incoming light onto a photosensor array;
a deflector system comprising at least one deflector plate disposed at a non-perpendicular angle between the lens and the photosensor array;
an actuation device coupled to the deflector plate and operable under command of a camera controller;
an image processor coupled to receive images from the photosensor array, to store images in a temporary-storage area of a memory system, to process images from the temporary storage area of the memory system, and to save processed images in a processed-images area of the memory system, all under direction of firmware from the memory system;
wherein the camera system is configured to capture at least a first image with the deflector system in a first configuration and a second image with the deflector system in a second configuration to provide a focal point offset in a first offset axis on the photosensor array between the first and second image, and
wherein the firmware is configured to prepare an enhanced image from at least the first and second images; and
wherein the deflector system is configurable to provide a focal point offset in a second axis perpendicular to the first offset axis on the photosensor array, wherein the camera system is configured to capture at least a third image with the deflector system configured to provide the focal point offset in the second axis, and wherein the firmware is configured to prepare the enhanced image from at least the first, second, and third images; and
wherein the deflector system is configured such that the second image is offset by an integer number of pixels greater than or equal to one from the first image, and where each pixel of the enhanced image receives as color information intensities from at least two of the first, second, third, and fourth images; and
wherein the actuation device is a voltage source coupled to provide voltages to transparent conductive electrodes on the deflector plate, wherein the deflector plate is formed of a solid electrooptical material, wherein the actuation device applies a first voltage between the transparent conductive electrodes in the first configuration of the deflector system, and a second voltage between the transparent conductive electrodes in the second configuration of the deflector system.

2. The camera system of claim 1 wherein the electrooptical materials are selected from the group consisting of lithium niobate, lead-lanthanum-zirconate-titanate (PLZT), and lithium tantalate.

3. The camera system of claim 2 wherein a first deflector plate is configured to deflect images in the first offset axis, and a second deflector plate is configured to deflect images in a second offset axis perpendicular to the first offset axis.

4. A camera system comprising
a lens configured to focus incoming light onto a photosensor array;
a deflector system comprising at least one deflector plate disposed at a non-perpendicular angle between the lens and the photosensor array;
an actuation device coupled to the deflector plate and operable under command of a camera controller;
an image processor coupled to receive images from the photosensor array, to store images in a temporary-storage area of a memory system, to process images from the temporary storage area of the memory system, and to save processed images in a processed-images area of the memory system, all under direction of firmware from the memory system;
wherein the camera system is configured to capture at least a first image with the deflector system in a first configuration and a second image with the deflector system in a second configuration to provide a focal point offset in a first offset axis on the photosensor array between the first and second image, and wherein the firmware is configured to prepare an enhanced image from at least the first and second images; and wherein the deflector system is configurable to provide a focal point offset in a second axis perpendicular to the first offset axis on the photosensor array, wherein the camera system is configured to capture at least a third image with the deflector system configured to provide the focal point offset in the second axis, and wherein the firmware is configured to prepare the enhanced image from at least the first, second, and third images; and wherein the actuation device is a voltage source coupled to provide voltages to transparent conductive electrodes on the deflector plate, wherein the deflector plate is formed of a solid electrooptical material, wherein the actuation device applies a first voltage between the transparent conductive electrodes in the first configuration of the deflector system, and a second voltage between the transparent conductive electrodes in the second configuration of the deflector system.

5. A method of imaging comprising:

focusing incoming light onto a photosensor array;

the focused incoming light passing through a deflector system comprising at least one deflector plate disposed between a lens and the photosensor array, the deflector system comprising an actuation device coupled to the deflector plate;

receiving at least a first image with the deflector system in a first configuration;

receiving a second image with the deflector system in a second configuration to provide a focal point offset in a first axis on the photosensor array; and preparing an enhanced image from at least the first and second images;

wherein the deflector system is configurable to provide a focal point offset in a second axis perpendicular to the first offset axis on the photosensor array, and further comprising capturing a third image with the deflector system configured to provide the focal point offset in the second axis;

wherein the photosensor array has color filters organized over pixels in a four-cell, square, pattern with each pattern having at least one pixel of each of three colors;

wherein each pixel of the enhanced image receives as color information intensities from at least two of the first, second, and third images;

wherein the actuation device is a voltage source coupled to provide voltages to transparent conductive electrodes on the deflector plate, wherein the deflector plate is formed of a solid electrooptical material, wherein the actuation device applies a first voltage between the transparent conductive electrodes in the first configuration of the deflector system, and a second voltage between the transparent conductive electrodes in the second configuration of the deflector system.

6. The method of claim 5 wherein the deflector system is configured such that the second image is offset by an integer number of pixels plus half a pixel from the first image, and where the firmware is configured to prepare the enhanced image by interposing pixels of at least one of the first, second, and third images in another image of the first, second, third, and fourth images.

7. A method of imaging comprising:

focusing incoming light onto a photosensor array;

the focused incoming light passing through a deflector system comprising at least one deflector plate disposed between a lens and the photosensor array, the deflector system comprising an actuation device coupled to the deflector plate;

receiving at least a first image with the deflector system in a first configuration;

receiving a second image with the deflector system in a second configuration to provide a focal point offset in a first axis on the photosensor array; and preparing an enhanced image from at least the first and second images;

wherein the deflector system is configurable to provide a focal point offset in a second axis perpendicular to the first offset axis on the photosensor array, and further comprising capturing a third image with the deflector system configured to provide the focal point offset in the second axis;

wherein the actuation device is a voltage source coupled to provide voltages to transparent conductive electrodes on the deflector plate, and wherein the deflector plate is formed of a solid electrooptical material.

* * * * *